(12) United States Patent
Krittian

(10) Patent No.: US 9,765,798 B2
(45) Date of Patent: Sep. 19, 2017

(54) HYDROSTATIC DRIVE SYSTEM

(71) Applicant: Linde Hydraulics GmbH & Co. KG, Aschaffenburg (DE)

(72) Inventor: Lukas Krittian, Aschaffenburg (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 281 days.

(21) Appl. No.: 14/557,491

(22) Filed: Dec. 2, 2014

(65) Prior Publication Data
US 2015/0204356 A1    Jul. 23, 2015

(30) Foreign Application Priority Data
Dec. 13, 2013 (DE) .................. 10 2013 114 037

(51) Int. Cl.
| | | |
|---|---|---|
| *F16D 31/02* | (2006.01) | |
| *F15B 1/04* | (2006.01) | |
| *B60K 6/12* | (2006.01) | |
| *F15B 1/02* | (2006.01) | |
| *F15B 1/027* | (2006.01) | |
| *F15B 21/14* | (2006.01) | |
| *F16H 61/4096* | (2010.01) | |
| *F16H 37/08* | (2006.01) | |

(52) U.S. Cl.
CPC .................. *F15B 1/04* (2013.01); *B60K 6/12* (2013.01); *F15B 1/024* (2013.01); *F15B 1/027* (2013.01); *F15B 21/14* (2013.01); *F16H 61/4096* (2013.01); *B60K 2006/126* (2013.01); *F15B 2201/31* (2013.01); *F15B 2201/32* (2013.01); *F16H 2037/088* (2013.01); *F16H 2200/2005* (2013.01); *Y02T 10/6208* (2013.01)

(58) Field of Classification Search
CPC .... F15B 1/04; F15B 1/24; F15B 1/024; F15B 1/027

USPC .......................................................... 60/414
See application file for complete search history.

(56) References Cited

U.S. PATENT DOCUMENTS

| | | | | |
|---|---|---|---|---|
| 2012/0308404 A1* | 12/2012 | Bauer | ...................... | B60K 6/12 |
| | | | | 417/46 |
| 2014/0373522 A1* | 12/2014 | Cullman | .................. | E02F 9/128 |
| | | | | 60/414 |

FOREIGN PATENT DOCUMENTS

DE    102007012121 A1    9/2007

OTHER PUBLICATIONS

Machine Translatin of Mueller DE 102007012121.*

* cited by examiner

*Primary Examiner* — Michael Leslie
*Assistant Examiner* — Daniel Collins
(74) *Attorney, Agent, or Firm* — The Webb Law Firm

(57) ABSTRACT

A hydrostatic drive system (1) with a hydrostatic pump (3) driven by a drive motor (2) and connected in a closed circuit with a hydrostatic motor (4). The hydrostatic motor (4) is connected with a consumer (5). The closed circuit is formed by a first hydraulic connection (6a) and a second hydraulic connection (6b). A pressure accumulator device (30) can be connected with the two hydraulic connections (6a, 6b) for the storage of energy and the output of energy. The pressure accumulator device (30) is a double piston accumulator (31) having a high-pressure-side pressure chamber (32) and a low-pressure-side pressure chamber (33). The high-pressure-side pressure chamber (32) can be connected with one of the two hydraulic connections (6a, 6b) of the closed circuit and simultaneously the low-pressure-side pressure chamber (33) can be connected with the respective other hydraulic connection (6b, 6a) of the closed circuit.

30 Claims, 10 Drawing Sheets

HYDROSTATIC DRIVE SYSTEM

CROSS REFERENCE TO RELATED APPLICATION

This application claims priority to German Application No. 102013114037.8 filed Dec. 13, 2013, which is herein incorporated by reference in its entirety.

BACKGROUND OF THE INVENTION

Field of the Invention

This invention relates to a hydrostatic drive system with a hydrostatic pump which is driven by a drive motor and is connected in a closed circuit with a hydrostatic motor. The hydrostatic motor is in a drive connection with a consumer. The closed circuit is formed by a first hydraulic connection and a second hydraulic connection. A pressure accumulator device can be connected with the two hydraulic connections for the storage of energy and the discharge of energy.

Description of Related Art

Hydrostatic drive systems in a closed circuit are used for the drive of a consumer in vehicles such as motor vehicles or public transit vehicles, e.g., buses, preferably for urban mass transit, and for mobile self-propelled machines, in particular industrial trucks, agricultural machines, forestry machines and construction machines, such as, for example, excavators, wheel and telescoping loaders, tractors, combine harvesters, forage harvesters, sugar beet and potato harvesters.

With a pressure accumulator device (for the storage of energy and the discharge of energy) that can be connected with both hydraulic connections of the closed circuit, a hybrid drive concept and, thus, a hybrid function can be realized in a hydrostatic drive system with a closed circuit. The consumer can be driven in a drive phase with the energy in the pressure accumulator device during a discharge operation of the pressure accumulator device. If the pressure accumulator device is operated in a charging operation during a braking or deceleration phase of the consumer and is charged with hydraulic fluid, energy can be recovered during the braking or deceleration of the consumer.

In a hydrostatic drive system in a closed circuit, it should be ensured that during the charging operation of the pressure accumulator device, during which a determined amount of hydraulic fluid is removed from the pressure accumulator device out of the high-pressure-side hydraulic connection of the closed circuit, the corresponding quantity of hydraulic fluid is made up at the low-pressure-side hydraulic connection of the closed circuit. Correspondingly, during discharge operation of the pressure accumulator device, during which a determined quantity of hydraulic fluid is fed from the pressure accumulator device to the high-pressure-side hydraulic connection of the closed circuit, it should be ensured that the corresponding quantity of hydraulic fluid is diverted from the low-pressure-side hydraulic connection of the closed circuit.

To make possible this quantity and volumetric balancing at the low-pressure-side hydraulic connection of the closed circuit during the extraction or the addition of a quantity of hydraulic fluid at the high-pressure-side hydraulic connection by the pressure accumulator device, it is known that the pressure accumulator device can be formed by a high pressure accumulator and a separate low pressure accumulator. DE 10 2007 012 121 A1 describes a generic hydrostatic drive system with a pressure accumulator device that has a high pressure accumulator and a separate low pressure accumulator that compensates for the hydraulic fluid volumetric flow of the high pressure accumulator, which is extracted or added at the high-pressure-side hydraulic connection of the closed circuit, on the low-pressure-side hydraulic connection.

In DE 10 2007 012 121 A1, the high pressure accumulator of the pressure accumulator device can be connected with the respective high-pressure-side hydraulic connection of the closed circuit. Correspondingly, the separate low pressure accumulator of the pressure accumulator device can be connected with the respective low-pressure-side hydraulic connection of the closed circuit. A pressure accumulator device of this type with two separate pressure accumulators is complex and expensive to build and takes up a great deal of space, as a result of which the hybrid function of the pressure accumulator device entails a high level of expense and effort for the construction and operation of the system.

Therefore, it is an object of this invention to provide a hydrostatic drive system in which the hybrid function of the pressure accumulator device has a simple, compact, and economical construction.

SUMMARY OF THE INVENTION

The invention accomplishes this object in that the pressure accumulator device is a double piston accumulator. The double piston accumulator has a high-pressure-side pressure chamber and a low-pressure-side pressure chamber. The high-pressure-side pressure chamber of the double piston accumulator can be connected with one of the two hydraulic connections of the closed circuit and simultaneously the low-pressure-side pressure chamber of the double piston accumulator can be connected with the respective other hydraulic connection of the closed circuit. The invention therefore teaches that with a double piston accumulator, only one single pressure accumulator is present, which with the high-pressure-side pressure chamber performs the function of the high pressure accumulator and with the low-pressure-side pressure chamber the function of the low pressure accumulator. Thus, the pressure accumulator device occupies little space and, therefore, the hybrid construction can be implemented compactly with a double piston accumulator. Moreover, a double piston accumulator, in contrast to two separate accumulators, i.e., one high pressure accumulator and one low pressure accumulator of the prior art, has a simple and economical construction. A significant advantage of a double piston accumulator is that with a double piston accumulator, it is easily possible in a hydrostatic drive system with a closed circuit to achieve a theoretically exact balancing of the quantity of hydraulic fluid in the low-pressure-side hydraulic connection during the extraction or addition of a quantity of hydraulic fluid on the high-pressure-side hydraulic connection, so that the quantity and volumetric balance in the two hydraulic connections of the closed circuit is guaranteed with little added construction effort or expense.

In one advantageous embodiment of the invention, the double piston accumulator has a housing in which two pistons are located so that they can be displaced longitudinally and are rigidly connected with each other by a coupling part, in particular, a piston rod. Between the two pistons, the housing is provided with a partition through which the coupling part extends. Each piston has a coupling-part-side pressure chamber and an opposite piston-side pressure chamber. A double piston accumulator of this type has a simple and robust construction. The two pistons also make it possible in a simple manner to have pressure chambers with equal areas available to perform the function of the high pressure accumulator and the low pressure accumulator, which thereby guarantees an exact compensation of the quantity of hydraulic fluid in the low-pressure-side hydraulic connection during the extraction or the addition of a quantity of hydraulic fluid to the high-pressure-side hydraulic connection with little extra construction effort or expense.

In one embodiment of the invention, the coupling-part-side pressure chamber of the first piston forms the high-pressure-side pressure chamber and the coupling-part-side pressure chamber of the second piston forms the low-pressure-side pressure chamber. The coupling-part-side pressure chambers of the two pistons, which chambers have equal areas, therefore form the high-pressure-side pressure chamber and the low-pressure-side pressure chamber of the double piston accumulator.

In an alternative embodiment of the invention, the piston-side pressure chamber of the first piston forms the high-pressure-side pressure chamber and the piston-side pressure chamber of the second piston forms the low-pressure-side pressure chamber. The piston-side pressure chambers of the two pistons, which chambers have equal areas, therefore form the high-pressure-side pressure chamber and the low-pressure-side pressure chamber of the double piston accumulator.

The high-pressure-side pressure chamber can be realized in a simple manner in the double piston accumulator if the pressure chamber of the first piston that faces the high-pressure-side pressure chamber is under a precharge.

In one advantageous embodiment of the invention, the pressure chamber of the first piston under a precharge is a precharge pressure chamber which is precharged with a gas pressure. The double piston accumulator therefore forms a hydropneumatic accumulator element.

The low-pressure-side pressure chamber can be implemented in a simple manner in the double piston accumulator if the pressure chamber of the second piston facing the low-pressure-side pressure chamber of the second piston is depressurized.

In one embodiment of the invention, the high-pressure-side pressure chamber of the double piston accumulator is connected in a fixed manner to one of the two hydraulic connections of the closed circuit and the low-pressure-side pressure chamber of the double piston accumulator is connected in a fixed manner to the other hydraulic connection of the closed circuit. A connection of this type of the double piston accumulator to the two hydraulic connections of the closed circuit has a simple construction from a switching point of view and makes it possible to charge the high-pressure-side pressure chamber of the double piston accumulator on the primary side with energy from the drive motor. The energy stored in the double piston accumulator can then be used during a drive phase of the consumer to drive the consumer in a selected direction of movement of the consumer, so that the double piston accumulator makes it possible to provide a boost for the drive motor in a drive phase of the consumer.

In one embodiment of the invention, a valve device is provided with which, in a first control position, the high-pressure-side pressure chamber of the double piston accumulator is connected to the first hydraulic connection of the closed circuit and the low-pressure-side pressure chamber of the double piston accumulator is simultaneously connected to the second hydraulic connection of the closed circuit, and in a second control position, the high-pressure-side pressure chamber of the double piston accumulator is connected to the second hydraulic connection of the closed circuit and the low-pressure-side pressure chamber of the double piston accumulator is simultaneously connected to the first hydraulic connection of the closed circuit. With a valve device of this type, it becomes possible to optionally connect the high-pressure-side pressure chamber and the low-pressure-side pressure chamber of the double piston accumulator with each of the two hydraulic connections of the closed circuit. With a valve device of this type, in combination with a double piston accumulator, it is possible in a simple manner for both directions of movement of the consumer to charge the high-pressure-side pressure chamber of the double piston accumulator during a braking phase of the consumer and thus to recover the braking energy of the consumer. The valve device also makes it possible to then use the energy stored in the double piston accumulator during a drive phase of the consumer to drive the consumer for both directions of movement of the consumer.

In one advantageous embodiment of the invention, the valve device is in communication by means of a first connecting line with the first hydraulic connection of the closed circuit, by means of the second connecting line with the second hydraulic connection of the closed circuit, by means of a high pressure accumulator line with the high-pressure-side pressure chamber of the double piston accumulator, and by means of a low pressure accumulator line with the low-pressure-side pressure chamber of the double piston accumulator.

In the first control position, the valve device connects the first connecting line with the high pressure accumulator line and the second connecting line with the low pressure accumulator line, and in the second control position connects the first connecting line with the low pressure accumulator line and the second connecting line with the high pressure accumulator line. With a valve device of this type, it becomes possible in a simple manner for both directions of movement of the consumer, to recover the braking energy during a braking phase of the consumer and to drive the consumer with the double piston accumulator during a drive phase of the consumer.

In one development of the invention, the valve device has a closed position, in which the connection of the connecting lines with the high pressure accumulator line and/or the low pressure accumulator line is shut off. With a closed position of this type, the hybrid function formed by the double piston accumulator can be deactivated in a simple manner.

In one embodiment of the invention, the valve device is a four-port, two-position control valve that has the first control position and the second control position. With a control valve of this type, it is possible with little added construction effort or expense to form the hybrid function with the double piston accumulator in both directions of movement of the consumer.

In an alternative embodiment of the invention, the valve device is a four-port, three-position control valve, which has the first control position and the second control position and is provided with the closed position as a middle position. With a control valve of this type, it is possible with little extra construction effort or expense, to form the hybrid function with the double piston accumulator in both directions of movement of the consumer and to deactivate the hybrid function by means of the closed position.

In an alternative embodiment of the invention, the valve device is formed by a plurality of individual valves. The design of the valve device as a distributed construction with a plurality of individual valves, e.g. simple switching valves, also makes it possible with little added construction effort or expense, to form the hybrid function with the double piston accumulator in both directions of movement of the consumer as well as to deactivate the hybrid function.

In one advantageous embodiment of the invention, the valve device can have a first shuttle valve which is connected to the first connecting line and to the second connecting line, and is connected on the output side to the low pressure accumulator line, and a second shuttle valve which is connected on the input side to the first connecting line and to the second connecting line, and on the output side to the high pressure accumulator line.

In the first control position, the first shuttle valve advantageously connects the second connecting line with the low pressure accumulator line, and in the second control position the first connecting line with the low pressure accumulator line, and the second shuttle valve, in the first control position, connects the first connecting line with the high pressure accumulator line, and in the second control position connects the second connecting line with the high pressure accumulator line. With a valve device formed by two shuttle valves, it becomes possible in a simple manner to recover the braking energy for both directions of movement of the consumer during a braking phase of the consumer, and during a drive phase of the consumer to drive the consumer with the double piston accumulator.

In an alternative embodiment of the invention, a controlled deactivation of the hybrid function formed by the double piston accumulator can be achieved with little added construction effort or expense if at least one switching valve with a closed position and an open position is provided, which is associated with the high-pressure-side pressure chamber or the low-pressure-side pressure chamber of the double piston accumulator.

The valve device can be a switching valve or a proportional valve.

In the drive system of the invention, the hydrostatic pump is a variable pump with a variable displacement volume, preferably a bilaterally variable displacement pump, and the hydrostatic motor is a constant motor with a fixed displacement volume or a variable motor with a variable displacement volume.

To vary the displacement volume of the variable pump and/or of the variable motor, an electronic control device is advantageously provided in which operating strategies are stored to charge the high-pressure-side pressure chamber of the double piston accumulator, as a function of the operating conditions of the drive system, with energy from the drive motor and/or during braking operation of the consumer with braking energy from the consumer. It therefore becomes possible to charge the high-pressure-side pressure chamber of the double piston accumulator during certain operating conditions in which excess energy occurs at the drive motor and/or during braking operation of the consumer with the braking energy that occurs to make it possible to recover the energy. The electronic control device is in communication with corresponding signal generators, on the basis of which the respective operating condition and/or braking operation of the consumer can be determined, for example, an accelerator pedal device or a brake pedal when the consumer is the traction drive of a vehicle.

In the drive system of the invention, operating strategies are stored in the electronic control device to use the hydraulic fluid from the charged high-pressure-side pressure chamber of the double piston accumulator, depending on the operating conditions of the drive system, to drive the hydrostatic motor and/or to drive the hydrostatic pump. As a result of the drive of the hydrostatic motor with hydraulic fluid from the charged high-pressure-side pressure chamber of the double piston accumulator, a booster drive of the running drive motor can be achieved. If the hydraulic fluid from the charged high-pressure-side pressure chamber of the double piston accumulator is used to drive the hydrostatic pump, the hydrostatic pump can be used as a hydraulic starter of the shutoff drive motor. The double piston accumulator of the invention can therefore be used to assist the running drive motor and/or as a hydraulic starter in the framework of a start-stop function of the drive motor, whereby an economical start-stop function of the drive motor can be achieved on account of the robust construction and operation of the hydrostatic displacement machine.

To be able to start the shutoff internal combustion engine in combination with the hydrostatic pump, in one development of the invention the variable displacement motor can be set to a displacement volume of zero, and during the drive of the hydrostatic pump by the hydraulic fluid from the charged high-pressure-side pressure chamber of the double piston accumulator, the variable displacement motor is set to a displacement volume of zero. It thus becomes possible for hydraulic fluid from the charged high-pressure-side pressure chamber of the double piston accumulator not to drive the hydrostatic motor and to flow only to the hydrostatic pump, where it can be used to start the shutoff drive motor.

The switching valve can advantageously be actuated electrically and for its actuation is in communication with the electronic control device. The hybrid function formed by the double piston accumulator can therefore be activated and deactivated by means of the electronic control device by a corresponding actuation of the switching valve in a simple manner as a function of the operating conditions of the drive system.

In one embodiment of the invention, the valve device can be actuated electronically and for its actuation is in communication with the electronic control device. With the electronic control device, the valve device can be actuated in a simple manner as a function of the operating conditions of the drive system to charge or discharge the high-pressure-side pressure chamber of the double piston accumulator.

In one alternative embodiment of the invention, the valve device can be actuated hydraulically, and for its actuation is connected with the hydraulic connections of the closed circuit. A hydraulically controlled valve device of this type, which is controlled by the pressures present in the hydraulic connections of the closed circuit, therefore forms a hydraulically controlled shuttle valve that controls the connection of the high-pressure-side pressure chamber and of the low-pressure-side pressure chamber of the double piston accumulator with the two hydraulic connections.

A first control pressure line is advantageously provided which runs from the first hydraulic connection of the closed circuit to a control surface of the valve device that acts in the direction of the first control position, and a second control pressure line is provided which runs from the second hydraulic connection of the closed circuit to a control surface of the valve device that acts in the direction of the second control position. It is thereby possible in a simple manner to connect the high-pressure-side hydraulic connection of the closed circuit with the high-pressure-side pressure chamber of the double piston accumulator and the low-pressure-side hydraulic connection of the closed circuit with the low-pressure-side pressure chamber of the double piston accumulator.

The consumer can be in the form of a slewing gear of a vehicle driven by the hydrostatic motor. With the double piston accumulator of the invention, on the vehicle with the slewing gear such as a mobile machine in the form of an excavator, during braking operation of the slewing gear, energy can be recovered and the drive motor can be assisted during the acceleration of the slewing gear.

Alternatively, the consumer can be the traction drive of a vehicle, for example a drive axle with at least two driven drive wheels driven by the hydrostatic motor. With the double piston accumulator, on a vehicle with a traction drive comprising one drive axle, energy can be recovered during braking operation of the vehicle and the drive motor can be boosted during the acceleration of the vehicle.

Alternatively, the consumer can be a winch, for example a crane winch.

In one development of the invention, the hydrostatic drive of the invention can be a continuously variable hydrostatic branch of a power split transmission.

The invention further relates to a vehicle with a hydrostatic drive system of the invention. With the double piston accumulator, which can be in communication with the hydraulic connections of the hydrostatic circuit, it is possible to create a compact serial hybrid in a vehicle in a simple and economical manner.

BRIEF DESCRIPTION OF THE DRAWINGS

Additional advantages and details of the invention are described in greater detail below with reference to the accompanying schematic figures illustrating exemplary embodiments of the invention, in which like reference numbers identify like parts throughout.

DESCRIPTION OF THE PREFERRED EMBODIMENTS

Figure 1:
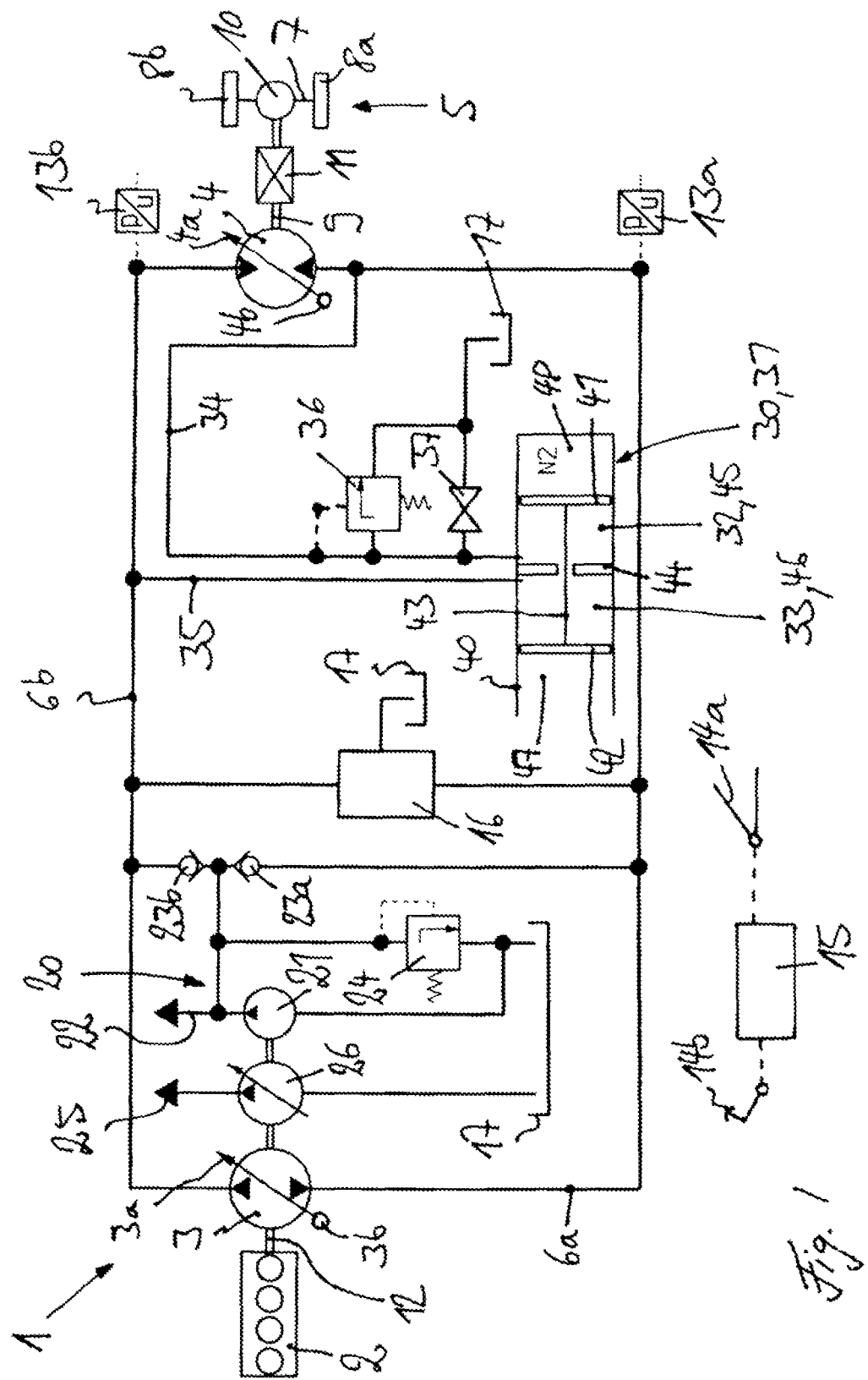
FIG. 1 shows a first embodiment of a hydrostatic drive system of the invention.
Figure 2:
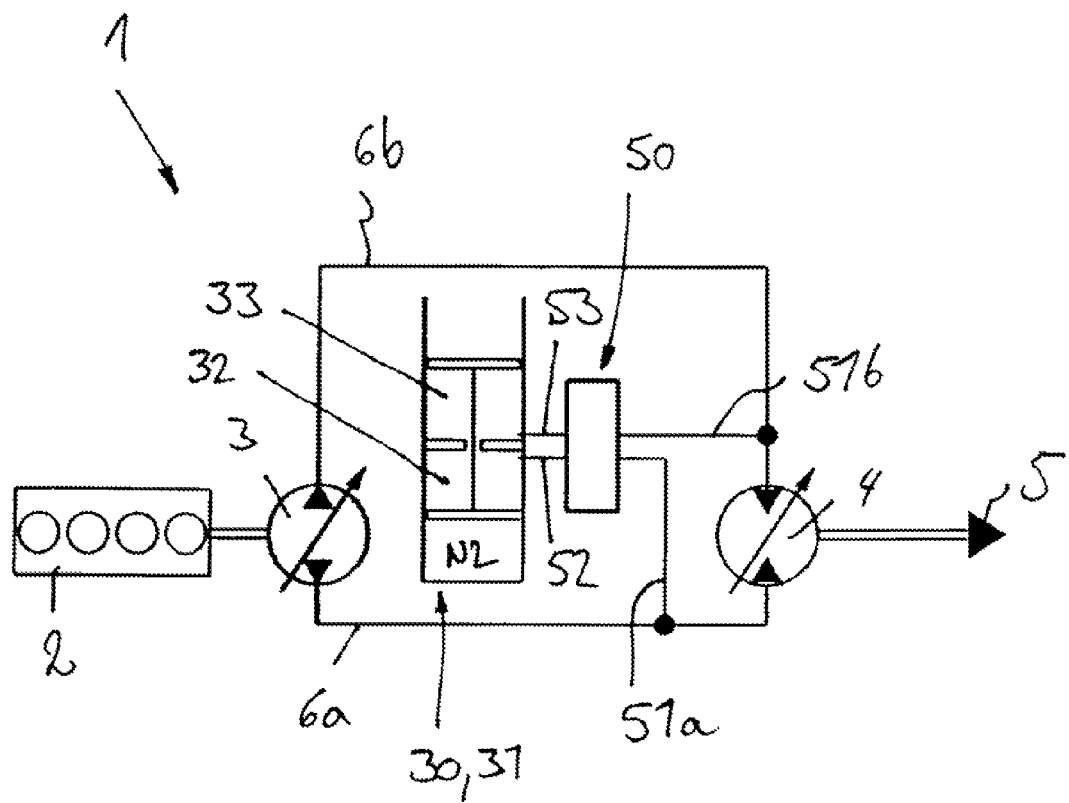
FIG. 2 shows a second embodiment of a hydrostatic drive system of the invention.

FIG. 1 illustrates a drive train of a vehicle with a hydrostatic drive system 1 of the invention.

The hydrostatic drive 1 has a hydrostatic pump 3 which is driven by a drive motor 2 and is connected in a closed circuit with a hydrostatic motor 4. The motor 4 is in a drive connection with a consumer 5. The closed circuit is formed by a first hydraulic connection 6a and a second hydraulic connection 6b.

In the illustrated exemplary embodiment, the drive motor is an internal combustion engine.

In the illustrated exemplary embodiment, the consumer 5 is a traction drive of a vehicle and comprises a drive axle 7 with two driven wheels 8a, 8b. An output shaft 9 of the motor 4 is in communication with a differential transmission 10 of the drive axle 7, which drives the wheels 8a, 8b by means of corresponding output shafts. The drive axle 7 can be driven directly by the motor 4. In the illustrated exemplary embodiment, the motor 4 is in a drive connection with the drive axle 7 with the interposition of a transmission 11.

The pump 3 is in an operative connection for its drive with a drive shaft 12 of the drive motor 2. The pump 3 is a variable pump with a variable displacement volume which can be varied in both directions, starting from a null position in which the displacement volume is zero, so that depending on the direction of actuation, the pump 3 can deliver into both hydraulic connections 6a, 6b.

The displacement volume of the pump 3 can be controlled electrically or electro-hydraulically, in particular electro-proportionally. For this purpose, a displacement volume control device 3a of the pump 3 can be electrically actuated by means of an electrical actuator device 3b which, for its actuation, is in communication with an electronic control device 15.

The motor 4 can be a constant motor with a fixed displacement volume. In the illustrated exemplary embodiment, the motor 4 is a variable displacement motor. The motor 4 can be controlled electrically or electro-hydraulically, in particular electro-proportionally. A displacement volume control device 4a of the motor 4 can be electrically actuated by means of an electrical actuator device 4b which, for its own actuation, is in communication with the electronic control device 15.

The electronic control device 15 is also in communication with pressure sensors 13a, 13b that measure the corresponding pressure in the associated hydraulic connection 6a, 6b. On the input side, the electronic control device 15 is also in communication with signal generators 14a, 14b which in the illustrated exemplary embodiment are formed by an accelerator pedal device 14a and a brake pedal device 14b.

Depending on the delivery direction of the pump 3 or depending on the operating status (drive phase or braking phase) of the consumer 5, one of the hydraulic connection 6a or 6b, respectively, forms the high-pressure-side hydraulic connection of the closed circuit and the respective other hydraulic connection 6b or 6a, respectively, forms the low-pressure-side hydraulic connection of the closed circuit.

If the displacement volume control device 3a of the pump 3 is set so that the pump 3 delivers into the first hydraulic connection 6a, the drive system is in a drive phase and the motor 4 is driven in a first direction of movement which, in the illustrated traction drive as the consumer 5, corresponds to the forward direction of travel of the vehicle. In the drive phase in the first direction of movement of the consumer 5, the first hydraulic connection 6a therefore forms the high-pressure-side hydraulic connection and the second hydraulic connection 6b forms the low-pressure-side hydraulic connection of the closed circuit. If the drive system enters into a braking phase during the deceleration of the consumer 5, the pressure relationships in the hydraulic connections 6a, 6b are reversed. The motor 4 functions as a pump and delivers hydraulic fluid via the second hydraulic connection 6b to the pump 3, which functions as a motor. In the braking phase in the first direction of movement of the consumer 5, the second hydraulic connection 6b therefore forms the high-pressure-side hydraulic connection and the first hydraulic connection 6a forms the low-pressure-side hydraulic connection of the closed circuit.

If the displacement volume control device 3a of the pump 3 is set so that the pump 3 delivers into the second hydraulic connection 6b, the drive system is in a drive phase and the motor 4 is driven in a second direction of movement, which in the illustrated traction drive as the consumer 5, corresponds to the travel of the vehicle in reverse. In the drive phase in the second direction of movement of the consumer 5, the second hydraulic connection 6$b$ therefore represents the high-pressure-side hydraulic connection and the first hydraulic connection 6$a$ the low-pressure-side hydraulic connection of the closed circuit. If the drive system enters a braking phase during the deceleration of the consumer 5, the pressure relationships in the hydraulic connections 6$a$, 6$b$ are reversed. The motor 4 functions as a pump and delivers hydraulic fluid via the first hydraulic connection 6$a$ to the pump 3, which functions as a motor. During the braking phase in the second direction of movement of the consumer 5, the first hydraulic connection 6$a$ therefore represents the high-pressure-side hydraulic connection and the second hydraulic connection 6$b$ the low-pressure-side hydraulic connection of the closed circuit.

The closed circuit is also provided with a discharge device 16 that connects the respective low-pressure-side hydraulic connection 6$a$ or 6$b$ of the closed circuit with a tank 17. The hydraulic volumetric flow that is discharged from the closed circuit to the discharge device 16 is made up by means of a charging device 20 that is formed by a charging pump 21 of the drive train and is driven by the drive motor 2. The charging pump 21 is operated in an open circuit, takes in hydraulic fluid from the tank 17, and delivers into a delivery line 22. The delivery line 22 of the charging pump 21 is in communication by means of charging valves 23$a$, 23$b$, respectively, with the hydraulic connections 6$a$, 6$b$, so that the volumetric flow of hydraulic fluid discharged at the discharge device 16 is made up by the charging pump 21 at the low-pressure-side hydraulic connection 6$a$ or 6$b$, respectively. A pressure relief valve 24 is associated with the delivery line 22 to protect the charging pressure of the charging pump 21.

Depending on the design of the vehicle, the drive train can comprise an additional hydraulic system, such as the working hydraulics of a mobile machine. In the illustrated exemplary embodiment, an additional pump 26 is provided for the supply of working hydraulics 25 and is driven by the drive motor 2.

The illustrated drive train is a serial hybrid, for which purpose the closed circuit is provided with a pressure accumulator device 30 which can be connected with the two hydraulic connections 6$a$, 6$b$ of the closed circuit for the absorption of energy and for the discharge of energy from or into the closed circuit.

The invention teaches that the pressure accumulator device 30 is a double piston accumulator 31 that has the function of a high pressure accumulator and a low pressure accumulator. The double piston accumulator 31 has a high-pressure-side pressure chamber 32 and a low-pressure-side pressure chamber 33.

In FIG. 1, the high-pressure-side pressure chamber 32 of the double piston accumulator 31 is connected in a fixed manner by means of a connecting line 34 to the first hydraulic connection 6$a$ of the closed circuit. Correspondingly, the low-pressure-side pressure chamber 33 of the double piston accumulator 31 is connected in a fixed manner by means of a connecting line 35 to the second hydraulic connection 6$b$ of the closed circuit.

To protect the accumulator charging pressure in the high-pressure-side pressure chamber 32 of the double piston accumulator 31, associated with the connecting line 34 is a pressure protection valve 34, such as a pressure relief valve, which is connected on the output side with the tank 17.

An exhaust valve 37 can also be provided which is actuated between a closed position and an open position to depressurize the high-pressure-side pressure chamber 32 of the double piston accumulator 31 to the tank 17.

The double piston accumulator 31 has a housing 40 in which two longitudinally displaceable pistons 41, 42 (first and second pistons) are located. The two pistons 41, 42 are rigidly connected to each other by means of the coupling part 43, such as a piston rod. Between the two pistons 41, 42, the housing 40 is provided with a partition 44 through which the coupling part 43 extends. The coupling part 43 is sealed and guided in the partition 44. The inner end surfaces of the two pistons 41, 42, together with the housing 40 and the partition 35, form the boundaries of respective pressure chambers 45, 46 (first and second chambers). The pressure chambers 45, 46 surround the coupling part 43 and are therefore coupling-part-side pressure chambers. The outer end surface of the piston 42, together with the housing 40, forms the boundary of a pressure chamber 47 (third pressure chamber) which is opposite the pressure chamber 46. The pressure chamber 47 in the illustrated exemplary embodiment is depressurized. In the illustrated exemplary embodiment, the pressure chamber 47 is vented for depressurization. The outer end surface of the piston 41, together with the housing 40 and a housing cover, forms the boundaries of a pressure chamber 48 (fourth pressure chamber) which is opposite the pressure chamber 45. The pressure chambers 47, 48 are piston-side pressure chambers. In the illustrated exemplary embodiment, the pressure chamber 48 is under a precharge. In the illustrated exemplary embodiment, a gas precharge is provided as the precharge, such as nitrogen, so that the double piston accumulator 31 is a hydro-pneumatic accumulator.

The inner end of the surfaces of the two pistons 41, 42 and the outer end surface of the two pistons 41, 42 each have the same area.

In the illustrated exemplary embodiment, the coupling-part-side pressure chamber 45 of the piston 41 of the double piston accumulator 31 forms the high-pressure-side pressure chamber 32 and thus the high pressure accumulator of the pressure accumulator device 30. The opposite coupling-part-side pressure chamber 46 of the piston 42 of the double piston accumulator 30 forms the low-pressure-side pressure chamber 33 and thus the low pressure accumulator of the pressure regulator device 30. Respective pressure chambers with equal-area piston surfaces of the two pistons 41, 42 therefore form the high-pressure-side pressure chamber 32 and the low-pressure-side pressure chamber 33 of the double piston accumulator 31. This arrangement ensures that the same quantity of hydraulic fluid that is extracted by means of the connecting line 34 from the high-pressure-side hydraulic connection of the closed circuit or is fed into the high-pressure-side hydraulic connection of the closed circuit is added via the connecting line 35 in the low-pressure-side hydraulic connection of the closed circuit or extracted from the low-pressure-side hydraulic connection of the closed circuit.

The exemplary embodiment in FIG. 1, in which the high-pressure-side pressure chamber 32 of the double piston accumulator 31 is connected in a fixed manner by means of the connecting line 34 to the first hydraulic connection 6$a$ of the closed circuit, and the low-pressure-side pressure chamber 33 of the double piston accumulator 31 is connected in a fixed manner by means of a connecting line 35 to the second hydraulic connection 6$b$ of the closed circuit, is particularly well-suited for the primary-side charging of the high-pressure-side pressure chamber 32 of the double piston accumulator 31 with energy from the drive motor 2. The pump 3 that delivers into the first high-pressure-side hydraulic connection 6a and is driven by the drive motor 2 therefore delivers, via the connecting line 34, hydraulic fluid into the high-pressure-side pressure chamber 32 of the double piston accumulator 31. The balancing of the volumetric flow in the closed circuit is guaranteed in that the quantity of hydraulic fluid extracted by the double piston accumulator 31 from the high pressure side of the closed circuit during the charging of the high-pressure-side pressure chamber 32 is made up by the connection of the low-pressure-side pressure chamber 33 of the double piston accumulator 31 via the connecting line 35 with the low-pressure-side hydraulic connection 6b on the low-pressure side of the closed circuit.

When the high-pressure-side pressure chamber 32 of the double piston accumulator 31 is charged, the energy stored in the double piston accumulator 31 can be used to drive the motor 4, wherein hydraulic fluid from the high-pressure-side pressure chamber 32 of the double piston accumulator 31 is added via the connecting line 34 of the high-pressure-side hydraulic connection 6a. The balancing of the volumetric flow in the closed circuit is ensured, in that the quantity of hydraulic fluid added from the double piston accumulator 31 during the depressurization of the high-pressure-side pressure chamber 32 into the high-pressure side of the closed circuit is extracted by the connection of the low-pressure-side pressure chamber 33 of the double piston accumulator 31 via the connecting line 35 with the low-pressure-side hydraulic connection 6b from the low-pressure side of the closed circuit.

The charging or discharging of the high-pressure-side pressure chamber 32 of the double piston accumulator 31 can be influenced by means of the electronic control device 15 and a corresponding setting of the displacement volume control device 3a of the pump 3, and, optionally, of the displacement volume control device 4a of the motor 4. For this purpose, corresponding operating strategies for the charging or discharging of the high pressure side pressure chamber 32 of the double piston accumulator 31 (depending on the operating conditions of the drive) are stored in the electronic control device 15. The signals from the signal generators 14a, 14b and from the pressure sensors 13a, 13b can be analyzed by the electronic control device 15, and the displacement volume control device 3a of the pump 3, and, optionally, the displacement volume control device 4a of the motor 4, can be optimally set corresponding to the operating condition of the drive system 1.

The hydrostatic drive system 1 illustrated in FIG. 1 is advantageously suitable for use in a vehicle which is operated in travel cycles where there are only brief delays between the cycles and, therefore, little potential for charging the high-pressure-side pressure chamber 32 of the double piston accumulator 31 with braking energy during a braking phase of the consumer 5.

If the pump 3 and the motor 4 have a continuously variable displacement volume, in the event of a rapid pivoting of the displacement volume control devices 3a, 4a in FIG. 1 during the braking phase of the consumer 5, the braking energy can be stored by charging the high-pressure-side pressure chamber 32 of the double piston accumulator 31.

In the exemplary embodiment illustrated in FIGS. 2 to 12, there is also a valve device 50 with which the high-pressure-side pressure chamber 32 and the low-pressure-side pressure chamber 33 of the double piston accumulator 31 can optionally each be connected with each of the two hydraulic connections 6a or 6b, respectively. With the valve device 50, it thereby becomes possible for both directions of movement of the consumer 5 to charge the high-pressure-side pressure chamber 32 with energy from the drive motor 2 and/or with braking energy during a braking phase of the consumer 5, and to drive the consumer 5 in both directions of movement during the depressurization of the high-pressure-side pressure chamber 32.

The valve device 50 can be connected by means of the first connecting line 51a with the first hydraulic connection 6a of the closed circuit, and by means of a second connecting line 51b with the second hydraulic connection 6b of the closed circuit. The high-pressure-side pressure chamber 32 of the double piston accumulator 31 is connected with the valve device 50 by means of a high pressure accumulator line 52. The low-pressure-side pressure chamber 33 of the double piston accumulator 31 is connected with the valve device by means of a low pressure accumulator line 53.

Embodiments of the valve device 50 are illustrated in FIGS. 2 to 10.

The valve devices 50 illustrated in FIGS. 2 to 10 each have a first control position 50a, in which the high pressure side pressure chamber 32 of the double piston accumulator 31 is connected to the first hydraulic connection 6a of the closed circuit and the low-pressure-side pressure chamber 33 of the double piston accumulator 31 is simultaneously connected to the second hydraulic connection 6b of the closed circuit, and a second control position 50b, in which the high-pressure-side pressure chamber 32 of the double piston accumulator 31 is connected to the second hydraulic connection 6b of the closed circuit and the low-pressure-side pressure chamber 33 of the double piston accumulator 31 is simultaneously connected to the first hydraulic connection 6a of the closed circuit.

In the first control position 50a, the valve device 50 connects the first connecting line 51a with the high pressure accumulator line 52 and the second connecting line 51b with the low pressure accumulator line 53. In the second control position 50b, the valve device 50 connects the first connecting line 51a with the low pressure accumulator line 53 and the second connecting line 51b with the high pressure accumulator line 52.

The valve device 50 illustrated in FIGS. 3, 4, 8, and 9 also has a closed position 50c, in which the connection of the connecting lines 51a, 51b with the high pressure accumulator line 52 and the low pressure accumulator line 53 is shut off. In the closed position 50c, the double piston accumulator 31 is therefore isolated from the hydraulic connections 6a, 6b of the closed circuit.

The valve device 50 illustrated in FIGS. 3, 4, 8, and 9 is a four-port, three-position control valve 55, which has the first control position 50a and the second control position 50b, and is provided with the closed position 50c as the middle position.

Figure 3:
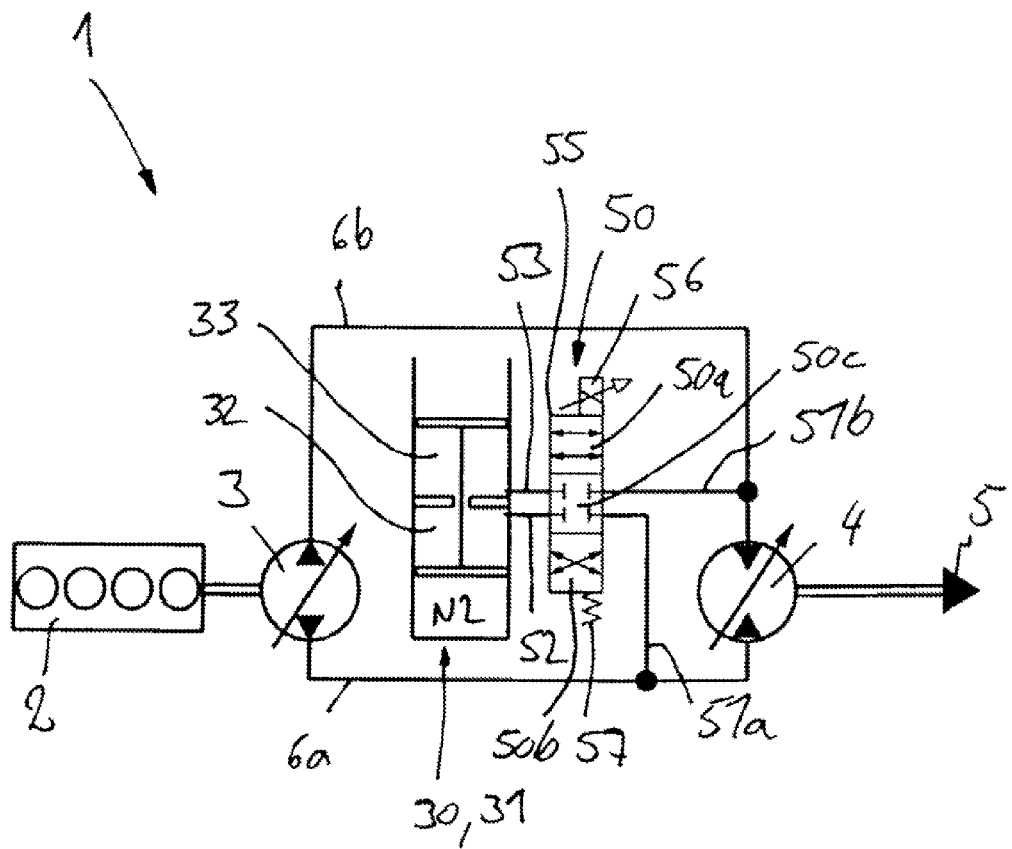
FIG. 3 shows a configuration of the embodiment illustrated in FIG. 2.
Figure 4:
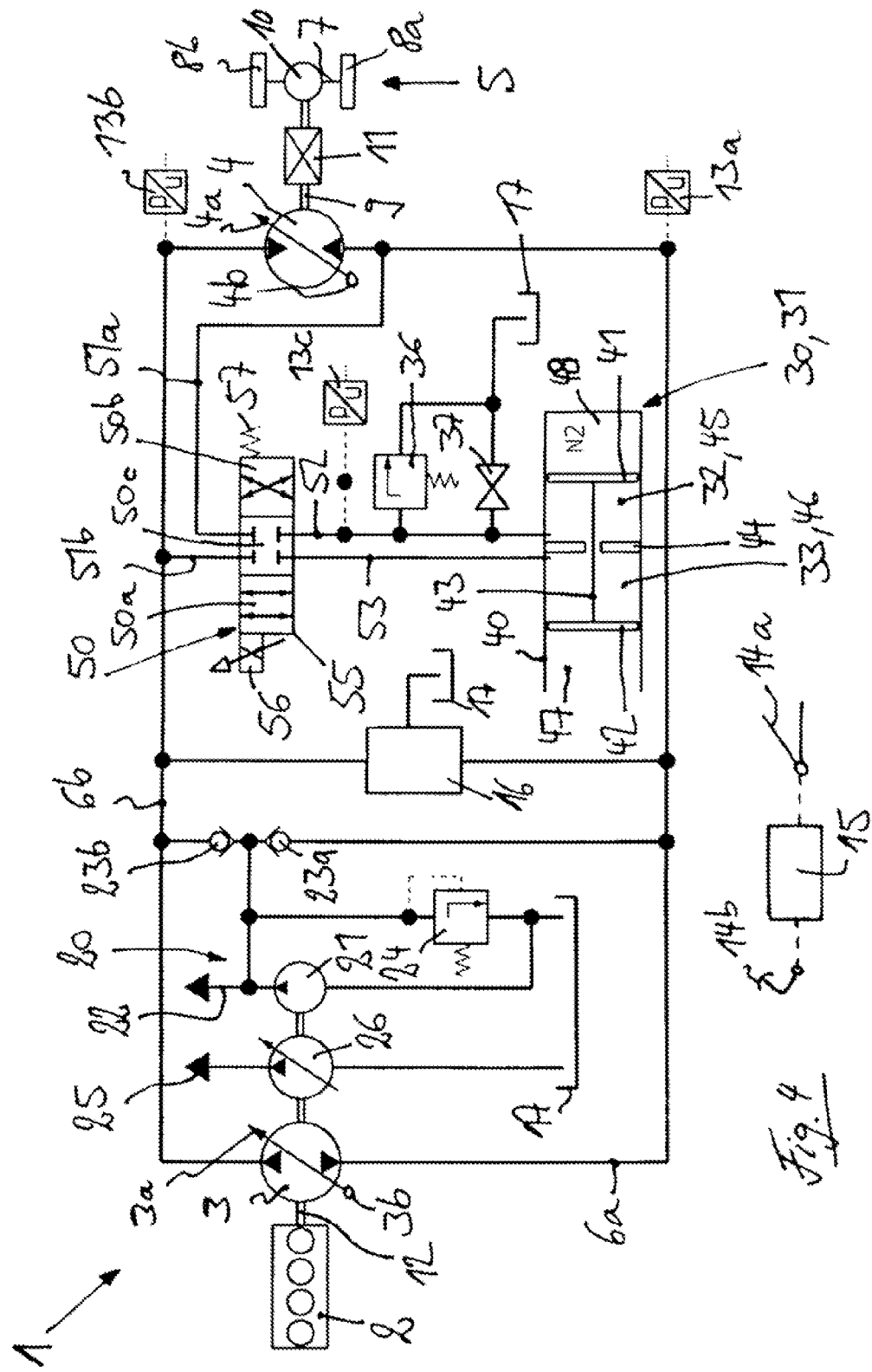
FIG. 4 shows the embodiment illustrated in FIG. 3 in an illustration like the one in FIG. 1.
Figure 5:
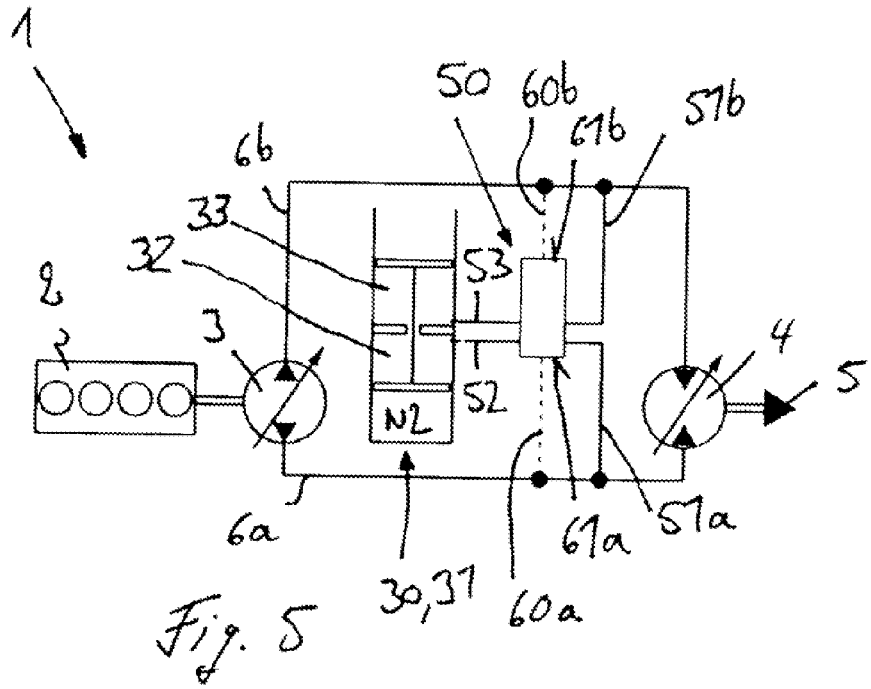
FIG. 5 shows an alternative configuration of FIG. 2.

FIGS. 3 and 4 illustrate one embodiment of the valve device 50 in which the valve device 50 can be actuated electronically, and is in communication for its actuation with the electronic control device 15. The valve device 50 in the illustrated exemplary embodiment can be actuated by at least one electrical actuator device 56, such as an actuator magnet or proportional magnet. The force of the electrical actuator device 56 counteracts the force of a spring device 57. In the illustrated exemplary embodiment, the spring device 57 actuates the valve device 50 into the second control position 50b, and the valve device 50 can be actuated into the closed position 50c and the first control position 50a by means of the electrical actuator device 56.

Instead of the illustrated embodiment of the electrical actuator, two springs can also be provided that actuate the valve device 50 into the closed position 50*c*, and two electrical actuator devices can be provided, wherein a first electrical actuator device actuates the valve device 50 into the first control position 50*a* and the second electrical actuator device actuates the valve device 50 into the second control position 50*b*.

FIG. 3 shows the hydrostatic drive system 1 in a simplified illustration. FIG. 4 shows the hydrostatic drive system 1 as illustrated in FIG. 3 with the additional components illustrated in FIG. 1, in particular, the discharge device 16 and the charging device 20. FIG. 4 also shows a pressure sensor 13*c* which measures the charging pressure present in the high-pressure-side pressure chamber 32 of the double piston accumulator 31 and is in communication with the electronic control device 15.

FIGS. 5 to 10 illustrate embodiments of the valve device 50 in which the valve device 50 can be hydraulically actuated and for its actuation is connected with the hydraulic connections 6*a*, 6*b* of the closed circuit. The valve device 50 therefore forms a hydraulically controlled shuttle valve, with which the high-pressure-side pressure chamber 32 can be connected with the corresponding high-pressure-side hydraulic connection 6*a* or 6*b*, respectively, and the low-pressure-side pressure chamber 33 of the double piston accumulator 31 can be connected with the corresponding low-pressure-side hydraulic connection 6*b* or 6*a*, respectively.

For the hydraulic actuation of the valve device 50, a first control pressure line 60*a* is provided which runs from the first hydraulic connection 6*a* of the closed circuit to a control surface 61*a* of the valve device 50 that acts in the direction of the first control position 50*a*, and a second control pressure line 60*b* which runs from the second hydraulic connection 6*b* of the closed circuit to a control surface 61*b* of the valve device 50 that acts in the direction of the second control position 50*b*.

Figure 6:
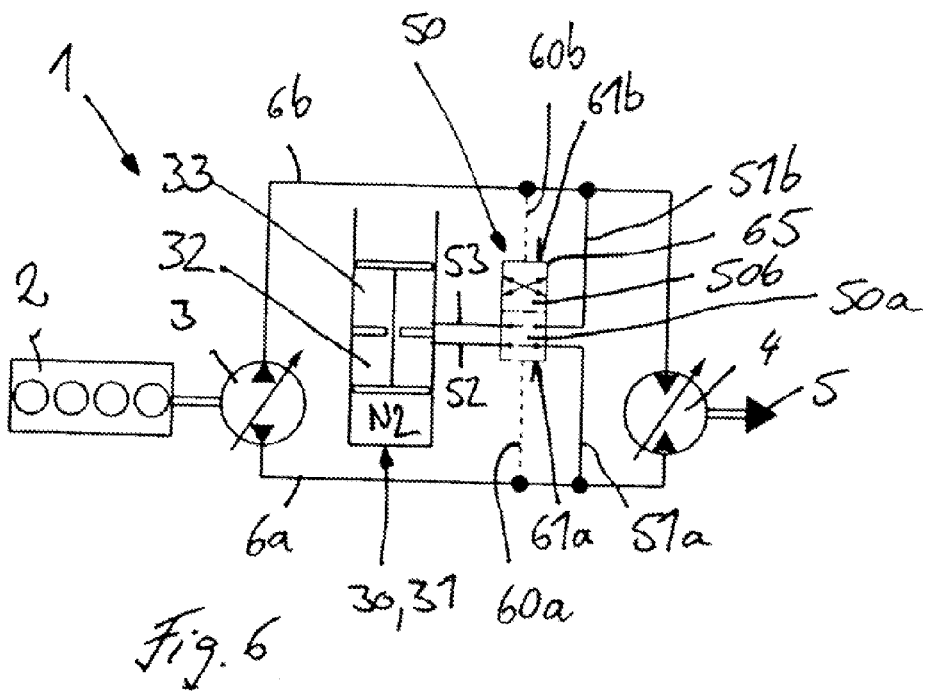
FIG. 6 shows a configuration of FIG. 5.
Figure 7:
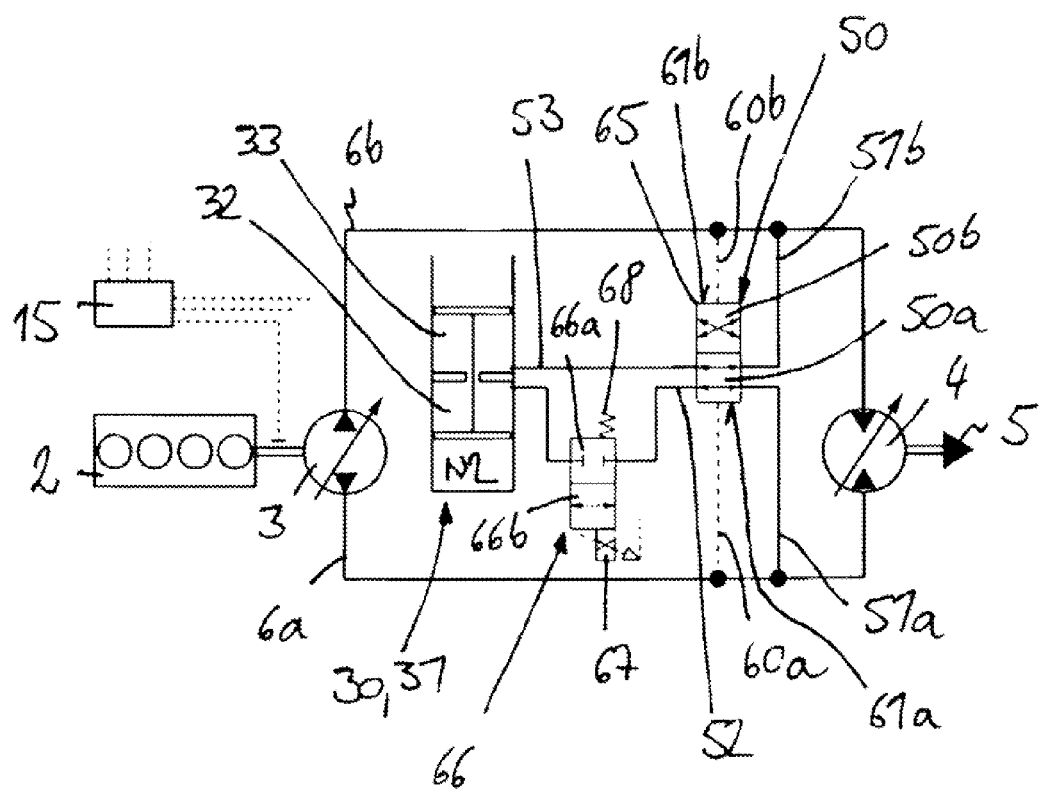
FIG. 7 shows a development of FIG. 6.

In FIGS. 6 and 7, the valve device 50 is a four-port, two-position control valve 65, which has the first control position 50*a* and the second control position 50*b*.

FIG. 7 shows a development of FIG. 6, in which a switching valve 66 with a closed position 66*a* and an open position 66*b* is associated with the high-pressure-side pressure chamber 32. The switching valve 66 is located in the high pressure accumulator line 52. The switching valve 66 can be actuated electrically and is in communication with an electrical actuator device 67. The electrical actuator device 67 is in communication for its actuation with the electronic control device 15. In the illustrated exemplary embodiment, the switching valve 66 is actuated by means of the spring 68 into the closed position 66*a* and can be actuated into the open position 66*b* by actuating the electrical actuator device 67. Alternatively, the spring can actuate the switching valve 66 into the open position 66*b* and the electrical actuator device 67 can actuate the switching valve 66 into the closed position 66*a*.

Alternatively, the switching valve 66 can be located in the first connecting line 51*a* or the second connecting line 51*b*, or in the low pressure accumulator line 53.

Analogous to the closed position 50*c* of the valve device 50 illustrated in FIGS. 3, 4, 8, and 9, the switching valve 66 makes possible a controlled deactivation of the function of the double piston accumulator 31 in the closed position 66*a*.

Figure 8:
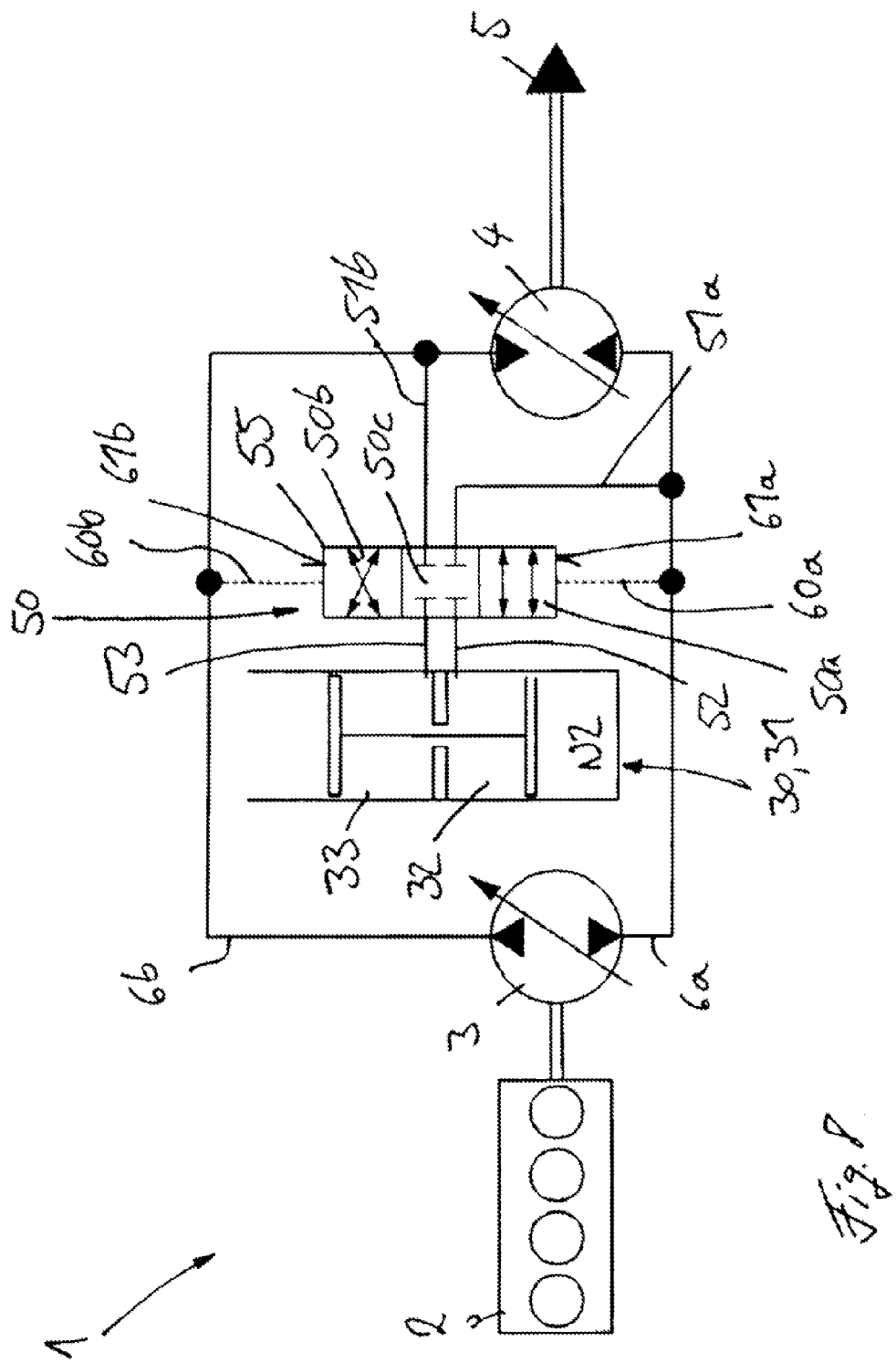
FIG. 8 shows an additional configuration of FIG. 5.
Figure 9:
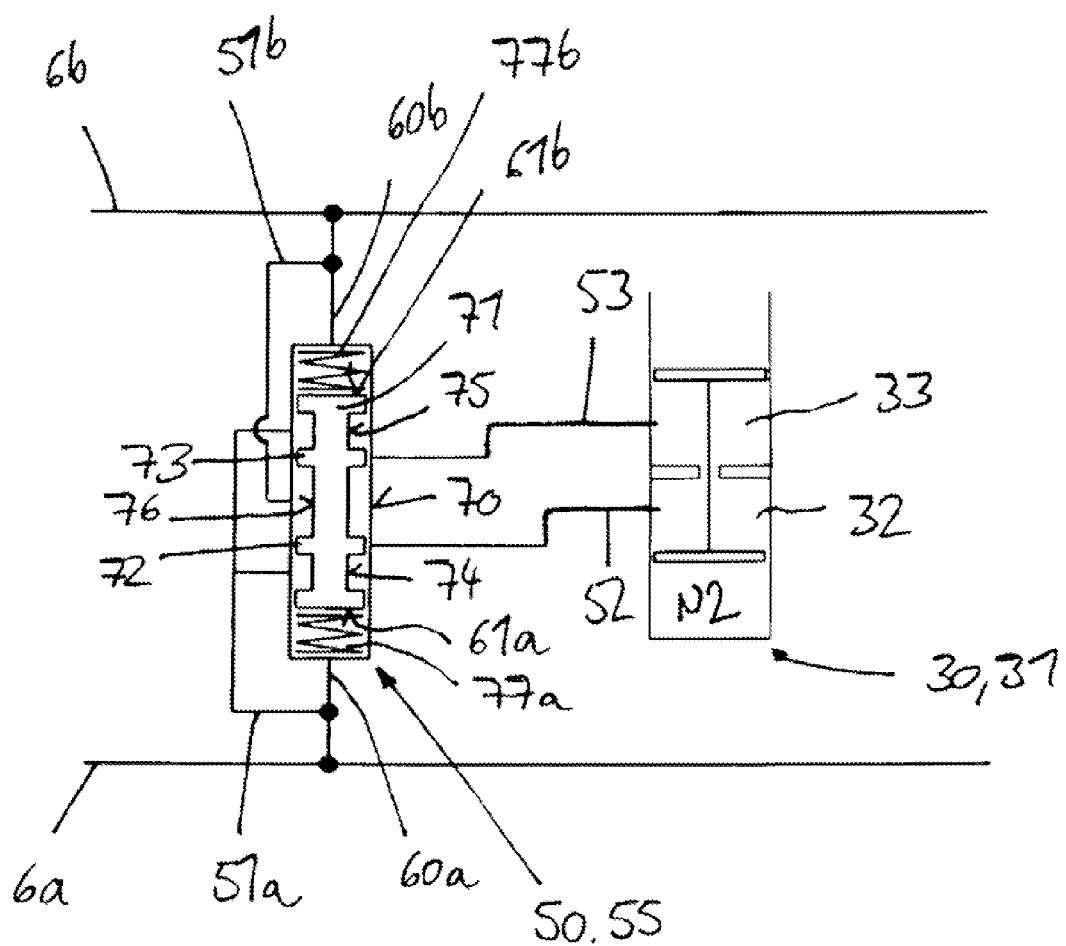
FIG. 9 shows a constructive embodiment of FIG. 8.

FIGS. 8 and 9 illustrate one embodiment of a hydraulically actuated valve device 50 which is provided with a closed position 50*c*, as illustrated in FIGS. 3 and 4.

FIG. 9 shows one constructive embodiment of the valve device 50 in FIG. 8. The valve device 50 is in the form of the spool valve which comprises a control element 71 located in a housing bore 70. The control element 71 is provided with piston flanges 72, 73, two outside control grooves 74, 75 and a third control groove 76 located between the piston flanges 72, 73. In the illustrated position, the valve device 50 is in the closed position, in which the piston flanges 72, 73 shut off the hydraulic connections to the high pressure accumulator line 52 and the low pressure accumulator line 53. The control element 71 is actuated by means of two springs 77*a*, 77*b* into the closed position, which is the middle position. The springs 77*a*, 77*b* are each located in control pressure chambers which are connected with the control pressure line 60*a* or 60*b*, respectively. The control surfaces 61*a*, 61*b* are located on the end surfaces of the control element 71.

If the hydraulic connection 6*a* forms the high-pressure side of the closed circuit, the control element 71 is actuated upward in FIG. 9 by means of the control pressure line 60*a* into the first control position. In the first control position, via the control groove 74, the first connecting line 51*a* (and thus the high-pressure-side first hydraulic connection 6*a*) are connected with the high pressure accumulator line 52 and, thus, with the high-pressure-side pressure chamber 32 of the double piston accumulator 31. In the first control position 50*a*, via the control groove 76, the low pressure accumulator line 53, and, thus, the low-pressure-side pressure chamber 33 of the double piston accumulator 31, are also connected with the second connecting line 51*b* and, thus, the low-pressure-side second hydraulic connection 6*b*.

If the hydraulic connection 6*b* forms the high-pressure side of the closed circuit, by means of the control pressure line 60*b*, the control element 71 is moved downward in FIG. 9 into the second control position. In the second control position, via the control groove 76, the high pressure accumulator line 53 and, thus, the high-pressure-side pressure chamber 32 of the double piston accumulator 31, are connected with the second hydraulic line 51*b* and, thus, with the high-pressure-side second hydraulic connection 6*b*. In the second control position 50*b*, by means of the control groove 75, the low pressure accumulator line 53 and, thus, the low-pressure-side pressure chamber 33 of the double piston accumulator 31 are connected with the first connecting line 51*a* and, thus, with the low-pressure-side first hydraulic connection 6*a*.

Figure 10:
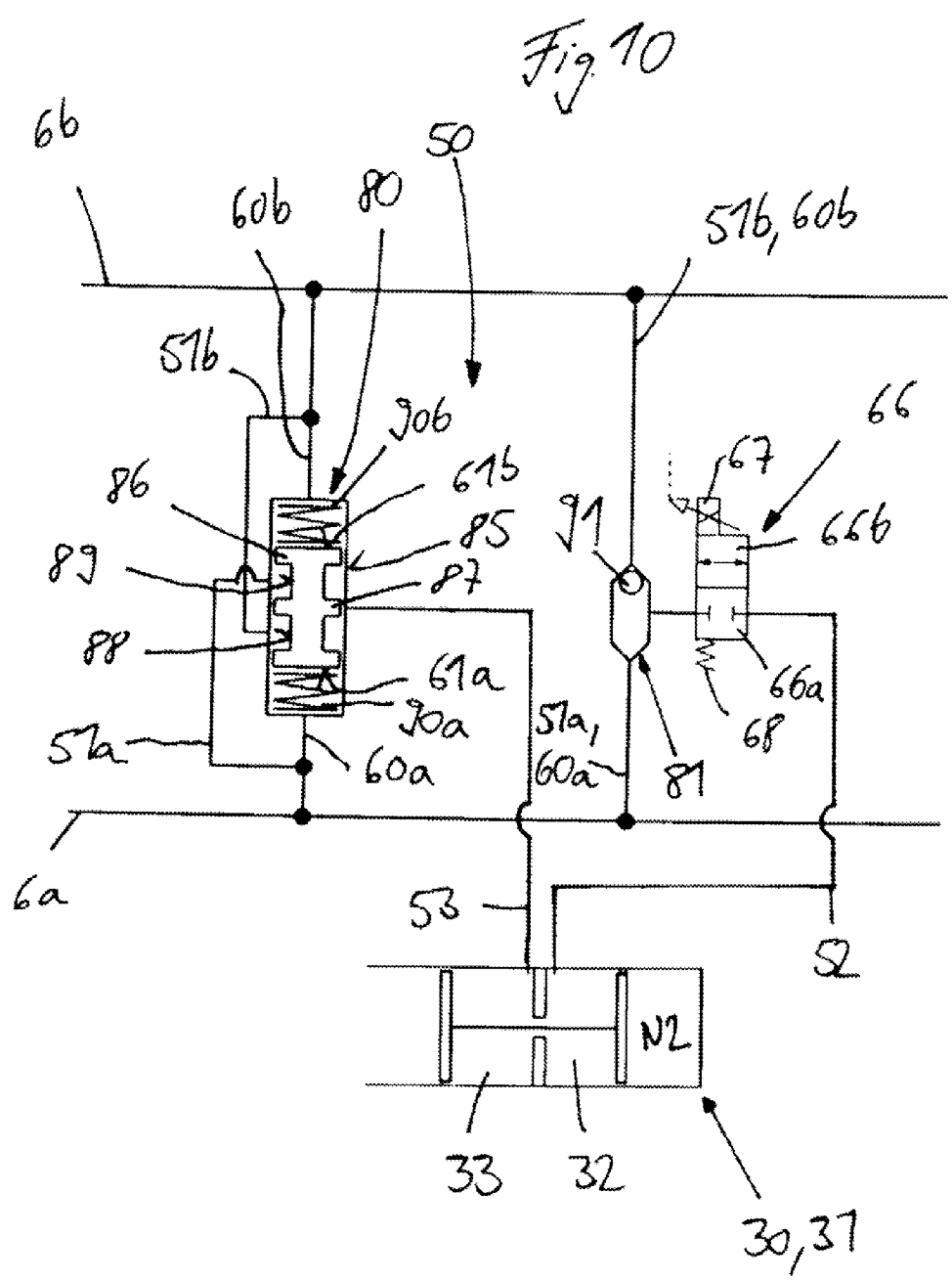
FIG. 10 shows an additional embodiment of FIG. 5.

FIG. 10 illustrates an embodiment of the invention in which the valve device 50 is formed by a plurality of individual valves and, therefore, the valve function of the valve device 50 is performed by a plurality of individual valves in a distributed construction.

The valve device 50 is controlled hydraulically as a function of the pressures present in the control pressure lines 60*a*, 60*b* and, thus, in the hydraulic connections 6*a*, 6*b* and, therefore, forms a hydraulically controlled shuttle valve.

The valve device 50 illustrated in FIG. 10 has a first shuttle valve 80 connected on the input side to the first connecting line 51*a* and to the second connecting line 51*b*, and on the output side to the low pressure accumulator line 53, and a second shuttle valve 81 which is also connected on the input side to the first connecting line 51*a* and to the second connecting line 51*b*, and on the output side to the high pressure accumulator line 52. The first shuttle valve 80 therefore controls the connection of the hydraulic connection 6*a* or 6*b*, respectively, with the low-pressure-side pressure chamber 33 of the double piston accumulator 31. The second shuttle valve 81 correspondingly controls the connection of the hydraulic connection 6*a* or 6*b*, respectively, with the high-pressure-side pressure chamber 32 of the double piston accumulator 31.

The first shuttle valve 80 is a spool valve which comprises a control element 86 located in a housing bore 85. The control element 86 is provided with a piston flange 87 and two outside control grooves 88, 89. In the illustrated position, the first shuttle valve 80 is in the closed position, in which the piston flange 87 closes the hydraulic connection to the low pressure accumulator line 53. The control element 86 is actuated into the closed position, which is the middle position, by means of two springs 90*a*, 90*b*. The springs 90*a*, 90*b* are located in respective control pressure chambers that are connected with the control pressure line 60*a* or 60*b*, respectively. The control surfaces 61*a*, 61*b* are located on the end surfaces of the control element 86.

If the hydraulic connection 6*a* forms the high-pressure side of the closed circuit, the control element 86 is actuated upward in FIG. 10 by means of the control pressure line 60*a* into the first control position. In the first control position, by means of the control groove 88, the low pressure accumulator line 53, and, thus, the low-pressure-side pressure chamber 33 of the double piston accumulator 31, are connected with the second connecting line 51*b* and, thus, the low-pressure-side second hydraulic connection 6*b*.

If the hydraulic connection 6*b* forms the high-pressure side of the closed circuit, by means of the control pressure line 60*b*, the control element 86 is actuated downward in FIG. 10 into the second control position. In the second control position, the low pressure accumulator line 53 and, thus, the low-pressure-side pressure chamber 33 of the double piston accumulator 31 is connected via the control groove 89 with the first connecting line 51*a* and, thus, the low-pressure-side first hydraulic connection 6*a*.

The first shuttle valve 80, in the first control position, connects the second connecting line 51*b* with the low pressure accumulator line 53, and in the second control position connects the first connecting line 51*a* with the low pressure accumulator line 53.

The second shuttle valve 81 is a check valve with a valve element 91. The check valve is connected to opposite inputs on lines, each of which performs the function of the control pressure line 60*a*, 60*b*, and the connecting line 51*a*, 51*b*. On the output side, the check valve is connected to the high pressure accumulator line 52.

If the hydraulic connection 6*a* forms the high-pressure side of the closed circuit, the valve element 91 of the check valve is actuated by means of the control pressure line 60*a* upward into the position illustrated in FIG. 10 into the first control position in which the high pressure accumulator of line 52 and, thus, the high-pressure-side pressure chamber 32 of the double piston accumulator 31 is connected with the first connecting line 51*a*.

If the hydraulic connection 6*b* forms the high-pressure side of the closed circuit, the valve element 91 of the check valve is actuated downward in FIG. 10 by means of the control pressure line 60*b*, so that the high pressure accumulator line 52 and, thus, the high-pressure-side pressure chamber 32 of the double piston accumulator 31 is connected with the second connecting line 51*b*.

The second shuttle valve 81, in the first control position, therefore connects the first connecting line 51*a* with the high pressure accumulator line 52, and in the second control position connects the second connecting line 51*b* with the high pressure accumulator line 52.

Located in the high pressure accumulator line 52, analogous to FIG. 7, is an electrically actuatable switching valve 66 with which the function of the double piston accumulator 31 in the closed position 66 can be deactivated in a controlled manner.

The distributed construction of the valve function of the valve device 50 can, as an alternative to the configuration illustrated in FIG. 10, be formed by four individual valves, a first individual valve of which controls the connection of the first connecting line 51*a* with the high pressure accumulator line 52, a second individual valve controls the connection of the first connecting line 51*a* with the low pressure accumulator line 53, a third individual valve controls the connection of the second connecting line 51*b* with the high pressure accumulator line 52, and a fourth individual valve controls the connection of the second connecting line 51*b* with the low pressure accumulator line 53. The individual valves can each be switching valves with a closed position and an open position, and each of them can be hydraulically or electrically actuated.

The valve device 50 in FIGS. 2 to 10 can be a switched valve or a proportional valve.

In FIGS. 1 and 4, the hydrostatic drive system 1 is a hydrostatic transmission that drives the consumer 5, optionally with the interposition of a transmission 11.

Figure 11:
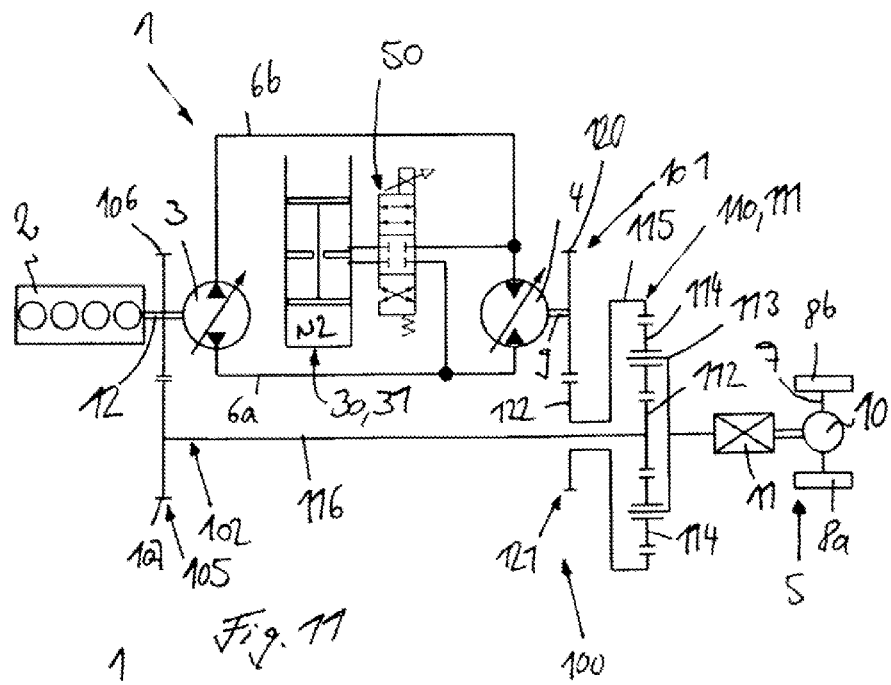
FIG. 11 shows a power split transmission with a hydrostatic drive system of the invention.
Figure 12:
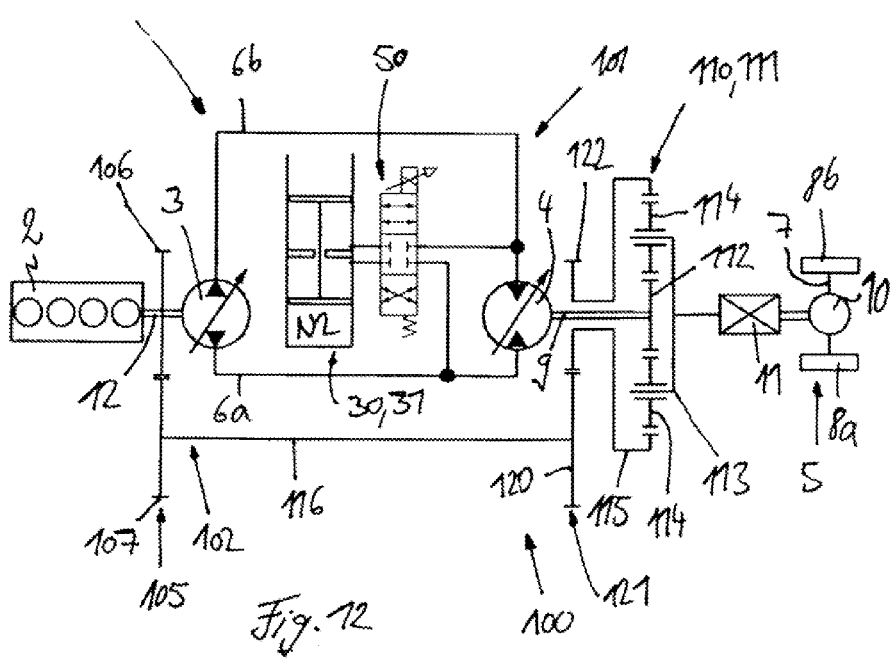
FIG. 12 shows a second embodiment of a power split transmission with a hydrostatic drive system of the invention.

In FIGS. 11 and 12, the hydrostatic drive system 1 is a continuously variable hydrostatic branch 101 of a power split transmission 100. The power split transmission 100 also has a mechanical branch 102, in which the hydrostatic branch 101 is switched parallel to the mechanical branch 102.

The power split transmission 100 is in an operative connection on the input side with the drive shaft 12 of the drive motor 2. The power split into the hydrostatic branch 101 and the mechanical branch 102 occurs in a transmission stage 105 with a first gear wheel 106 and a second gear wheel 107. The combination of the outputs of the hydrostatic branch 101 and the mechanical branch 102 occurs in a summing transmission 110.

In the illustrated embodiment, the summing transmission 110 is a planetary transmission 111. The planetary transmission 111 has a sun wheel 112, a planetary gear carrier 113 which is provided with one or more rotational planet wheels 114, and a ring gear 115. The planetary gear carrier 113 forms the output of the power split transmission 100 which is in a drive connection with the consumer 5.

In FIGS. 11 and 12, the consumer 5 is a traction drive system, analogous to FIGS. 1 and 4.

In FIG. 11, the sun wheel 112 is a component of the mechanical branch 102 and the ring gear 115 is a component of the hydrostatic branch 101. The sun wheel 112 is connected with the gearwheel 107 by means of a shaft 116. The output shaft 9 of the motor 4 of the hydrostatic drive system 1 drives the ring gear 115 of the planetary transmission 111. The output shaft 9 of the motor 4 is connected with a gear wheel 120 of a transmission stage 121, in which a second gear wheel 122 of the transmission stage 121 is connected with the ring gear 115.

FIG. 12 illustrates an alternative embodiment in which the drive elements have been interchanged in comparison to the planetary transmission 111 illustrated in FIG. 11.

In FIG. 12, the ring gear 115 is a component of the mechanical branch 102 and the sun wheel 112 is a component of the hydrostatic branch 101. The ring gear 115 is in communication via the shaft 116 with the gear wheel 107. The shaft 116 is connected with the gear wheel 120 of the transmission stage 121. The second gear wheel 122 of the transmission stage 121 is connected with the ring gear 115.

The output shaft 9 of the motor 4 of the hydrostatic drive system 1 drives the sun wheel 112 of the planetary transmission 111.

In FIGS. 11 and 12, in the hydrostatic drive system 1 there is a valve device 50 for the double piston accumulator 31 as illustrated in FIGS. 3 and 4. Alternatively, a valve device 50 as illustrated in one of the FIGS. 5 to 10 can be provided.

In the invention, operating strategies are stored in the electronic control device 15, which actuates the displacement volume control device 3a of the pump 3 (variable pump) and/or the displacement volume control device 4a of the variable motor, to charge the high-pressure-side pressure chamber 32 of the double piston accumulator 31 with hydraulic fluid as a function of the operating conditions of the drive system 1 with energy from the drive motor 2 and/or during braking operation of the consumer 5 with braking energy from the consumer 5. The charging of the high-pressure-side pressure chamber 32 of the double piston accumulator 31 with braking energy during a braking phase of the consumer 5 makes it possible to recover energy during the braking of the consumer 5.

Also stored in the electronic control device 15 are operating strategies to use the hydraulic fluid from the charged high-pressure-side pressure chamber 32 of the double piston accumulator 31, depending on the operating conditions of the drive system 1, for the drive of the hydrostatic motor 4 and/or for the drive of the hydrostatic pump 3.

During the charging and discharging of the double piston accumulator 31, the electronic control device 15 controls displacement volume control devices 3a and 4a, respectively, and the speed of rotation of the drive motor 2 as a function of the input variables from the signal generators 14a, 14b and from the pressure sensors 13a, 13b, 13c. When the valve device 15 is an electrically actuatable valve device 50, the electronic control device 15 also actuates the valve device 50 as a function of the input variables from the signal generators 14a, 14b.

The energy stored in the high-pressure-side pressure chamber 32 of the double piston accumulator 31 can be used by the drive system of the motor 4 to drive the motor 4. The double piston accumulator 31 therefore makes possible a booster drive of the running drive motor 2. Alternatively, the energy stored in the high-pressure-side pressure chamber 32 of the double piston accumulator 31 can be used to drive the pump 3. The double piston accumulator 31 therefore makes possible, in combination with the pump 3, the function of a hydraulic starter of the shutoff drive motor 2 in the framework of a start-stop function of the drive motor 2. For the function of the pump 3 as a hydraulic starter which is driven by the hydraulic fluid from the high-pressure-side pressure chamber 32 of the double piston accumulator 31, the motor 4, which is in the form of a variable motor, is set to the displacement volume zero.

The hybrid function of the invention formed by the double piston accumulator 31 can be used to assist the running drive motor 2 and/or as a hydraulic starter in the framework of a start-stop function of the drive motor 2. On account of the robust construction and operation of the pump 3, an economical start-stop function of the drive motor can be achieved. When the drive motor 2 is an internal combustion engine, with the hybrid function formed by the double piston accumulator 31, it is possible to reduce both fuel consumption and emissions during operation of the drive system 1.

The double piston accumulator 31 occupies a small amount of space, has a robust construction and operation, and is economical, so that with a double piston accumulator 31, a hydrostatic drive system 1 in a closed circuit can be provided, with little extra construction effort or expense, with a hybrid function, which makes it possible to discharge energy from the closed circuit or add energy to the closed circuit. Because pressure chambers 45, 46 and 47, 48 with equal areas form the respective high-pressure-side pressure chamber 32 and low-pressure-side pressure chamber 33, it becomes possible with a double piston accumulator 31 in a simple manner to achieve a theoretically exact quantitative and volume balance at the low-pressure-side hydraulic connection 6a or 6b of the closed circuit.

The invention is not limited to the illustrated exemplary embodiments.

The double piston accumulator 31 can also absorb and discharge hydraulic fluid from and into the two piston-side pressure chambers 47, 48. For example, the pressure chamber 45 can be precharged and the high-pressure-side pressure chamber is formed by the pressure chamber 48. The piston-side pressure chamber 47 can be closed by means of a housing cover so that the pressure chamber 47 can function as a low-pressure-side pressure chamber. In that case, the pressure chamber 46 can be depressurized.

The switching valve 66 illustrated in FIG. 7 can also be located in FIG. 1 in one of the connecting lines 34 or 35, to make it possible to activate and deactivate the hybrid function.

The pressure sensors 13a, 13b, 13e can be provided in all of the configurations and exemplary embodiments illustrated in the accompanying drawings.

The consumer 5, as an alternative to a traction drive, can be a slewing gear of the vehicle, for example a machine in the form of an excavator.

The pump 3 and the motor 4 of the hydrostatic drive system 1 can be an axial piston machine that utilizes a swashplate construction or a bent axis construction. Alternatively, the pump 3 and/or the motor 4 can be a radial piston machine or a gearwheel machine.

The drive motor 2, as an alternative to an internal combustion engine, can be an electric motor or a turbine.

It will be readily appreciated by those skilled in the art that modifications may be made to the invention without departing from the concepts disclosed in the foregoing description. Accordingly, the particular embodiments described herein are illustrative only and are not limiting the scope of the invention, which is to be given the full breadth of the appended claims and any and all equivalents thereof.

The invention claimed is:

1. A hydrostatic drive system, comprising:
   a hydrostatic pump driven by a drive motor and connected in a closed circuit with a hydrostatic motor, and wherein the hydrostatic motor is in a drive connection with a consumer, wherein the closed circuit is formed by a first hydraulic connection and a second hydraulic connection;
   a pressure accumulator device connectable with the first and second hydraulic connections for storage of energy and output of energy, wherein the pressure accumulator device comprises a double piston accumulator comprising a high-pressure-side pressure chamber and a low-pressure-side pressure chamber, wherein the high-pressure-side pressure chamber of the double piston accumulator is connectable with one of the hydraulic connections of the closed circuit and simultaneously the low-pressure-side pressure chamber of the double piston accumulator can be connected with the respective other hydraulic connection of the closed circuit;
   a valve device with which, in a first control position, the high-pressure-side pressure chamber of the double piston accumulator is connected to the first hydraulic connection of the closed circuit and simultaneously the low-pressure-side pressure chamber of the double piston accumulator is connected to the second hydraulic connection of the closed circuit, and in a second control position, the high-pressure-side pressure chamber of the double piston accumulator is connected to the second hydraulic connection of the closed circuit and simultaneously the low-pressure-side pressure chamber of the double piston accumulator is connected to the first hydraulic connection of the closed circuit;
a first control pressure line which runs from the first hydraulic connection of the closed circuit to a control surface of the valve device that acts in the direction of the first control position; and
a second control pressure line that runs from the second hydraulic connection of the closed circuit to a control surface of the valve device that acts in the direction of the second control position,
wherein the valve device is hydraulically actuated and is connected with the hydraulic connections of the closed circuit.

2. The hydrostatic drive system as recited in claim 1, wherein the double piston accumulator comprises a housing in which longitudinally displaceable first and second pistons are located which are rigidly connected with each other by a coupling part, and between the two pistons, the housing includes a partition, through which the coupling part extends, and wherein each piston includes a coupling-part-side pressure chamber and an opposite piston-side pressure chamber.

3. The hydrostatic drive as recited in claim 2, wherein the coupling-part-side pressure chamber of the first piston forms the high-pressure-side pressure chamber and the coupling-part-side pressure chamber of the second piston forms the low-pressure-side pressure chamber.

4. The hydrostatic drive system as recited in claim 2, wherein the piston-side pressure chamber of the first piston forms the high-pressure-side pressure chamber and the piston-side pressure chamber of the second piston forms the low-pressure-side pressure chamber.

5. The hydrostatic drive system as recited in claim 2, wherein the pressure chamber of the first piston opposite the high-pressure-side pressure chamber is precharged.

6. The hydrostatic drive system as recited in claim 5, wherein the precharged pressure chamber of the first piston is precharged with a gas pressure.

7. The hydrostatic drive system as recited in claim 2, wherein the pressure chamber of the second piston facing the low-pressure-side pressure chamber of the second piston is depressurized.

8. The hydrostatic drive system as recited in claim 1, wherein the high-pressure-side pressure chamber of the double piston accumulator is connected in a fixed manner to one of the hydraulic connections of the closed circuit, and the low-pressure-side pressure chamber of the double piston accumulator is permanently attached to the other hydraulic connection of the closed circuit.

9. The hydrostatic drive system as recited in claim 1, wherein the valve device is connected by means of the first connecting line with the first hydraulic connection of the closed circuit, by means of the second connecting line with the second hydraulic connection of the closed circuit, by means of a high pressure accumulator line with the high-pressure-side pressure chamber of the double piston accumulator, and by means of a low pressure accumulator line with the low-pressure-side pressure chamber of the double piston accumulator.

10. The hydrostatic drive system as recited in claim 9, wherein the valve device, in the first control position, connects the first connecting line with the high pressure accumulator line and the second connecting line with the low pressure accumulator line, and in the second control position connects the first connecting line with the low pressure accumulator line and the second connecting line with the high pressure accumulator line.

11. The hydrostatic drive system as recited in claim 9, wherein the valve device has a closed position, in which the connection of the connecting lines with the high pressure accumulator line and/or the low pressure accumulator line is/are shut off.

12. The hydrostatic drive system as recited in claim 1, wherein the valve device comprises a four-port, two-position control valve, which has the first control position and the second control position.

13. The hydrostatic drive system as recited in claim 1, wherein the valve device comprises a four-port, three-position control valve which has the first control position and the second control position and includes the closed position as a middle position.

14. The hydrostatic drive system as recited in claim 1, wherein the valve device comprises a plurality of individual valves.

15. The hydrostatic drive system as recited in claim 14, wherein the valve device comprises a first shuttle valve, which is connected on the input side to the first connecting line and to the second connecting line, and is connected on the output side to the low pressure accumulator line, and a second shuttle valve, which is connected on the input side to the first connecting line and to the second connecting line, and is connected on the output side to the high pressure accumulator line.

16. The hydrostatic drive system as recited in claim 15, wherein the first shuttle valve in the first control position connects the second connecting line with the low pressure accumulator line, and in the second control position connects the first connecting line with the low pressure accumulator line, and the second shuttle valve in the first control position connects the first connecting line with the high pressure accumulator line and in the second control position connects the second connecting line with the high pressure accumulator line.

17. The hydrostatic drive system as recited in claim 1, including at least one switching valve with a closed position and an open position, and which is associated with the high-pressure-side pressure chamber or the low-pressure-side pressure chamber of the double piston accumulator.

18. The hydrostatic drive system as recited in claim 1, wherein the valve device comprises a switching valve or a proportional valve.

19. The hydrostatic drive system as recited in claim 1, wherein the hydrostatic pump comprises a variable pump with a variable displacement volume, and the hydrostatic motor comprises a constant motor with a fixed displacement volume, or a variable motor with a variable displacement volume.

20. The hydrostatic drive system as recited in claim 19, including an electronic control device for variation of the displacement volume of the variable pump and/or of the variable motor, wherein operating strategies are stored in the electronic control device to charge the high-pressure-side pressure chamber of the double piston accumulator with hydraulic fluid as a function of the operating conditions of the drive system with energy from the drive motor and/or during the braking operation of the consumer with braking energy from the consumer.

21. The hydrostatic drive system as recited in claim 20, wherein operating strategies are stored in the electronic control device to use the hydraulic fluid from the charged high-pressure-side pressure chamber of the double piston accumulator as a function of the operating conditions of the drive system to drive the hydrostatic motor and/or to drive the hydrostatic pump.

22. The hydrostatic drive system as recited in claim 20, wherein the variable motor can be set to a displacement volume of zero and the variable motor, during the drive of the hydrostatic pump by the hydraulic fluid from the charged high-pressure-side pressure chamber of the double piston accumulator, is set to the displacement volume zero.

23. The hydrostatic drive system as recited in claim 17, wherein the switching valve is electrically actuated and is in communication with the electronic control device.

24. The hydrostatic drive system as recited in claim 1, wherein the valve device is electrically actuated and is in communication with the electronic control device.

25. The hydrostatic drive system as recited in claim 1, wherein the consumer is a slewing gear of a vehicle.

26. The hydrostatic drive system as recited in claim 1, wherein the consumer is a traction drive system of a vehicle.

27. The hydrostatic drive system as recited in claim 1, wherein the hydrostatic drive system is a continuously variable hydrostatic branch of a power split transmission.

28. A vehicle with a hydrostatic drive system as recited in claim 1.

29. A hydrostatic drive system, comprising:
a hydrostatic pump driven by a drive motor and connected in a closed circuit with a hydrostatic motor, and wherein the hydrostatic motor is in a drive connection with a consumer, wherein the closed circuit is formed by a first hydraulic connection and a second hydraulic connection;
a pressure accumulator device connectable with the first and second hydraulic connections for storage of energy and output of energy, wherein the pressure accumulator device comprises a double piston accumulator comprising a high-pressure-side pressure chamber and a low-pressure-side pressure chamber, wherein the high-pressure-side pressure chamber of the double piston accumulator is connectable with one of the hydraulic connections of the closed circuit and simultaneously the low-pressure-side pressure chamber of the double piston accumulator can be connected with the respective other hydraulic connection of the closed circuit; and
a valve device with which, in a first control position, the high-pressure-side pressure chamber of the double piston accumulator is connected to the first hydraulic connection of the closed circuit and simultaneously the low-pressure-side pressure chamber of the double piston accumulator is connected to the second hydraulic connection of the closed circuit, and in a second control position, the high-pressure-side pressure chamber of the double piston accumulator is connected to the second hydraulic connection of the closed circuit and simultaneously the low-pressure-side pressure chamber of the double piston accumulator is connected to the first hydraulic connection of the closed circuit,
wherein the valve device comprises a four-port, two-position control valve, which has the first control position and the second control position.

30. A hydrostatic drive system, comprising:
a hydrostatic pump driven by a drive motor and connected in a closed circuit with a hydrostatic motor, and wherein the hydrostatic motor is in a drive connection with a consumer, wherein the closed circuit is formed by a first hydraulic connection and a second hydraulic connection; and
a pressure accumulator device connectable with the first and second hydraulic connections for storage of energy and output of energy, wherein the pressure accumulator device comprises a double piston accumulator comprising a high-pressure-side pressure chamber and a low-pressure-side pressure chamber, wherein the high-pressure-side pressure chamber of the double piston accumulator is connectable with one of the hydraulic connections of the closed circuit and simultaneously the low-pressure-side pressure chamber of the double piston accumulator can be connected with the respective other hydraulic connection of the closed circuit;
wherein the hydrostatic pump comprises a variable pump with a variable displacement volume, and the hydrostatic motor comprises a constant motor with a fixed displacement volume, or a variable motor with a variable displacement volume, wherein an electronic control device is provided for variation of the displacement volume of the variable pump and/or of the variable motor,
wherein operating strategies are stored in the electronic control device to charge the high-pressure-side pressure chamber of the double piston accumulator with hydraulic fluid as a function of the operating conditions of the drive system with energy from the drive motor and/or during the braking operation of the consumer with braking energy from the consumer, and
wherein the variable motor can be set to a displacement volume of zero and the variable motor, during the drive of the hydrostatic pump by the hydraulic fluid from the charged high-pressure-side pressure chamber of the double piston accumulator, is set to the displacement volume zero.

* * * * *